United States Patent [19]

Nash

[11] 3,997,855
[45] Dec. 14, 1976

[54] DIGITAL FSK TIME RATE OF CHANGE MODULATOR

[75] Inventor: Harold Garth Nash, Tempe, Ariz.

[73] Assignee: Motorola, Inc., Chicago, Ill.

[22] Filed: Dec. 24, 1975

[21] Appl. No.: 644,202

[52] U.S. Cl. .................................. 332/9 R; 332/18; 325/163
[51] Int. Cl.² ........................................ H04L 27/12
[58] Field of Search ...................... 332/9 R, 9 T, 18; 325/163

[56] References Cited

UNITED STATES PATENTS

| | | | |
|---|---|---|---|
| 3,548,320 | 12/1970 | Roberts et al. | 332/9 |
| 3,659,226 | 4/1972 | Angeleri et al. | 332/9 |
| 3,713,017 | 1/1973 | Vena | 332/9 |

*Primary Examiner*—John Kominski
*Attorney, Agent, or Firm*—Kenneth R. Stevens; Harry M. Weiss

[57] ABSTRACT

A digital FSK time rate change modulator is responsive to a digital input signal and generates either a first or a second output frequency. The FSK modulator switches from one output frequency to the other in small increments over a predetermined time interval. The FSK modulator includes means for generating a first and a second timing signal and input means for receiving the digital input signal. An up-down counter having an up-count input and a down-count input counts up and down between a first and a second state. First gating means is coupled to the output of the up-down counter and to the input means and passes the second timing signal to the up-count input when a high level digital input signal is present on the input means and the up-down counter is not in the second state. Second gating means is coupled to the output of the up-down counter and to the input means and passes the second timing signal to the down-count input when a low level digital signal is present on the input means and the up-down counter is not in the first state. Variable counter means divides the first timing signal by predetermined number in response to the count on the up-down counter and generates a digital output signal. Sine wave generator means is coupled to the variable counter means and generates a digitally approximated sine wave having the same frequency as the digital output signal from the variable counter means.

8 Claims, 5 Drawing Figures

| θ | $f_0$ | ÷N | UP-DOWN COUNTER STATE |
|---|---|---|---|
| 0° | 2200 Hz | 455 | 000 |
| 25.7 | 2151 | 465 | 100 |
| 51.4 | 2012 | 497 | 010 |
| 77.1 | 1812 | 552 | 110 |
| 102.9 | 1588 | 630 | 001 |
| 128.6 | 1388 | 720 | 101 |
| 154.3 | 1249 | 801 | 011 |
| 180.0 | 1200 | 833 | 111 |

| UP-DOWN COUNTER STATE | | | ÷N | N_BASIC | ADDITIONAL COUNT | DERIVATION OF ADDITIONAL COUNT | | | | | | | | |
|---|---|---|---|---|---|---|---|---|---|---|---|---|---|---|
| $2^0$ | $2^1$ | $2^2$ | | | | 256 | 128 | 64 | 32 | 16 | 8 | 4 | 2 | 1 |
| 0 | 0 | 0 | 455 | 266 | 199 | | x | x | | | | x | x | x |
| 1 | 0 | 0 | 465 | 256 | 209 | | x | x | | x | | | | x |
| 0 | 1 | 0 | 497 | 256 | 241 | | x | x | x | x | | | | x |
| 1 | 1 | 0 | 552 | 512 | 40 | | | | x | | x | | | |
| 0 | 0 | 1 | 630 | 512 | 118 | | | x | x | x | | x | x | |
| 1 | 0 | 1 | 720 | 512 | 208 | | x | x | | x | | | | |
| 0 | 1 | 1 | 801 | 512 | 289 | x | | | x | | | | | x |
| 1 | 1 | 1 | 833 | 512 | 321 | x | | x | | | | | | x |

FIG. 5

DIGITAL FSK TIME RATE OF CHANGE MODULATOR

BACKGROUND OF THE INVENTION

This invention relates to frequency shift keying (FSK) modulators, and more particularly, to FSK modulators having the ability to change from one frequency to another in a quasi continuous manner using digital techiques.

Former FSK modulators instantaneouly changed from one output frequency to another when the input data changed state. For example, if a mark (1200 Hz) was being transmitted and a change to a space (2200 Hz) was desired, the frequency shift took place over a very short period of time compared to the period of the data bit. Due to this rapid and abrupt frequency transition the excessive and undesirable sideband energy was generated.

This invention provides a digital method to smoothly change from one modulation frequency to another over a significant portion of the bit period which reduces the unwanted sideband energy. Eliminating undesirable sideband energy allows more energy to be concentrated in the two primary sidebands. In any application where the amount of power transmitted is limited this reduction of unwanted sideband energy greatly increases the detection capability of the transmitted signal and also reduces any filtering requirements.

Some prior art FSK modulators do produce a smooth mark to space frequency change by the use of linear circuitry. Linear circuitry however has a number of inherent disadvantages. The linear circuitry apparatus requires a number of tuned circuits. These tuned circuits require initial adjustment and periodic callibration. As temperature and other environmental conditions change the output frequency of the linear circuit apparatus is altered.

The time rate change modulator of the present invention is all digital. No adjustment or periodic callibration is required. The apparatus uses a single crystal controlled oscillator to obtain stability of a very high order with a modest component cost. Due to the all-digital design, the time rate change modulator can readily be constructed on a single integrated circuit chip.

SUMMARY OF THE INVENTION

It is an object of this invention to provide a digital FSK time rate of change modulator which requires no initial adjustment and no periodic callibration.

It is another object of this invention to provide a digital time rate change modulator capable of using a crystal oscillator to generate a timing signal so that frequency accuracy of a high order can be obtained.

It is a still further object of this invention to provide a digital FSK time rate of change modulator which can be implemented using digital LSI techniques to reduce circuitry size, component count, and manufacturing costs.

It is still another object of this invention to provide a digital FSK time rate of change modulator having a variable output spectrum such that unwanted sideband energy during shifts in the output frequency is greatly reduced.

Briefly stated, and in accordance with one embodiment of the invention, a digital FSK time rate change modulator responsive to a digital input signal generates either a first or a second output frequency and switches from one output frequency to the other in small increments over a predetermined time interval. The digital FSK modulator includes means for generating a first and a second timing signal and input means for receiving the digital input signal. Up-down counter means having an output terminal means, an up-count input and a down-count input counts up and down between a first state and a second state. First gating means coupled to the output terminal means and to the input means passes the second timing signal to the up-count input when a high level digital input signal is present on the input means and the up-down counter means is not in the second state. Second gating means coupled to the output terminal means and to the input means passes the second timing signal to the down-count input when a low level digital input signal is present on the input means and the up-down counter means is not in the first state. Variable counter means divides the first timing signal by a predetermined number in response to the count on the output terminal means and generates a digital output signal. Sine wave generator means coupled to the variable counter means generates a digitally approximated sine wave having the same frequency as the digital output signal from the variable counter means.

BRIEF DESCRIPTION OF THE DRAWINGS

The invention is pointed out with particularity in the appended claims, however, other objects and advantages, together with the operation of the invention, may be better understood by reference to the following detailed description taken in connection with the following illustrations:

FIG. 5 is a table illustrating how the ÷ N control and ÷ N counter produce the desired division ratio.

DETAILED DESCRIPTION OF THE INVENTION

Figure 1:
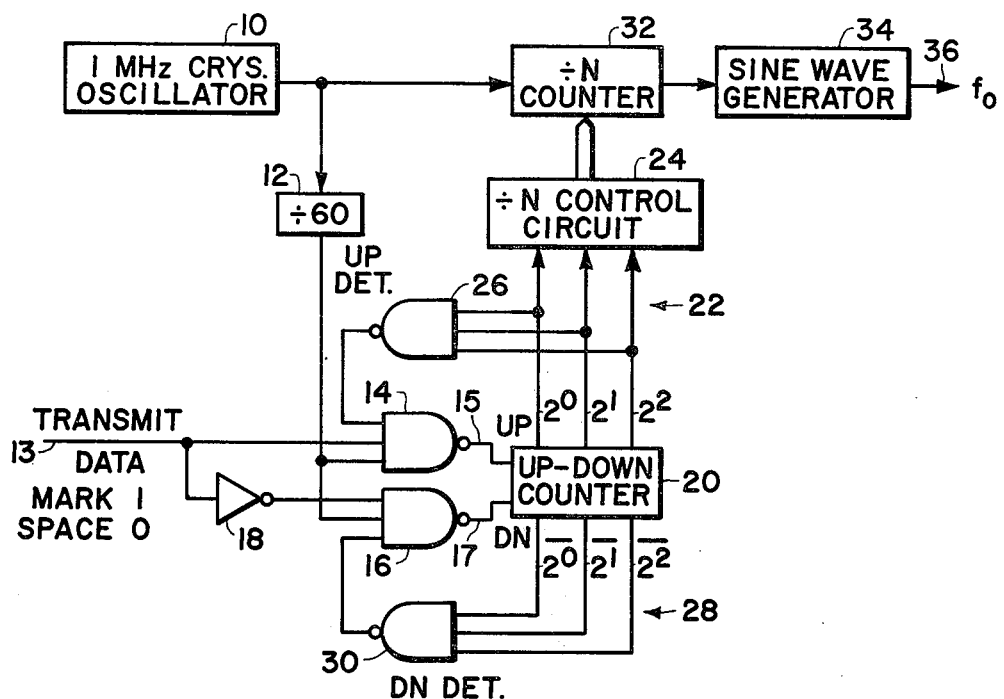
FIG. 1 is a generalized block diagram showing the elements of the digital time rate change modulator.

In order to better illustrate the advantages of the invention and its contribution to the art, a preferred hardware embodiment of the invention will now be described in some detail. The digital FSK time rate of change modulator in accordance with the invention, as illustrated in FIG. 1, includes a 1 MHz crystal oscillator 10 which produces a highly accurate timing signal. A divide by sixty counter 12 is coupled to the output of crystal oscillator 10. Incoming binary data is coupled to a gating circuit composed of NAND gates 14 and 16 and an inverter 18. The output of divide by 60 counter 12 is coupled to NAND gates 14 and 16. The output of NAND gate 14 is coupled to the up-count input 15 of up-down counter 20. The output of NAND gate 16 is coupled to the down-count input 17 of up-down counter 20. Up-down counter 20 has a plurality of outputs 22 which are coupled both to divide by N control circuit 24 and to up-detector 26. Up-down counter 20 has a second plurality of outputs 28 which are coupled to down-detector 30. The output of up-detector 26 is coupled to NAND gate 14 and the output of down-detector 30 is coupled to the input of NAND gate 16. A divide by N counter 32 receives an input signal both from crystal oscillator 10 and divide by N control circuit 24. The output of divide by N counter 32 is coupled to a sine wave generator 34 which produces the FSK output waveform at output conductor 36.

Figure 2:
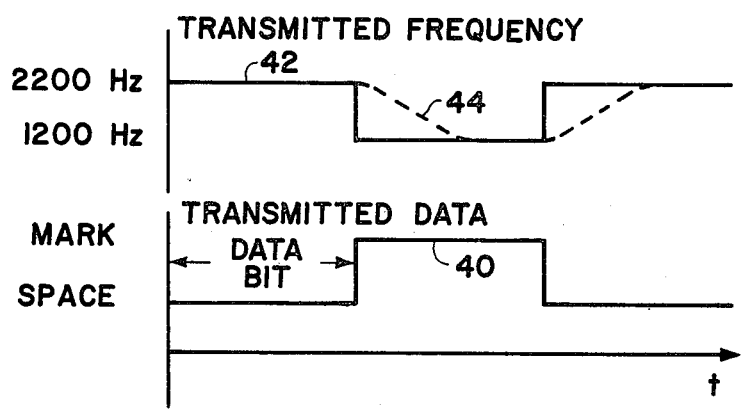
FIG. 2 is a graphical representation showing both the desired linear transition from mark to space and space to mark output frequencies and the abrupt instantaneous frequency change produced by many prior art FSK modulators.

FIG. 2 shows the relationship between the incoming binary transmitted data signal and the output frequency of an FSK modulator. Waveform 40 of FIG. 2 shows a transition in the input signal from a binary 0 to a binary 1 back to a binary 0. This corresponds to a transmission of a space, then a mark, then space. Each of these intervals is one data bit in length. Waveform 42 illustrates former methods of FSK modulation where the output frequency instantaneously changes from one valve to another when the input signal level changes. Waveform 42 shows an initial output frequency of 2200 Hz which shifts to an output frequency of 1200 Hz at the end of the first data bit. Each instantaneous frequency transition produces large amounts of unwanted sideband energy. Output waveform 44 shows a linear transition between the space frequency 2200 Hz and the mark frequency 1200 Hz. This smooth frequency transition greatly reduces the amount of undesirable sideband energy.

Figures 3, 4:
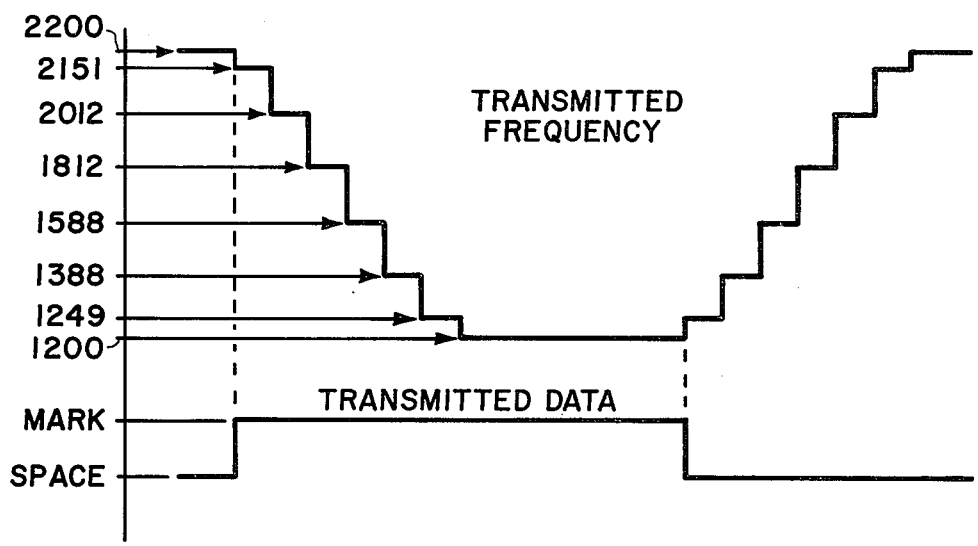
FIG. 3 is an illustration of the digital implementation of the desired piecewire linear transition from mark to space and space to mark output frequencies.
FIG. 4 is a table showing the numerical relationship between the state of the up-down counter and the output frequency of the digital time rate change modulator.

The digital time rate change modulator of the present invention closely approximates the waveform 44 in FIG. 2 by taking a series of incremental frequency steps between the mark-space frequencies. These quantized frequency steps are shown in FIG. 3. The frequency of each step is determined by the formula:

$$f_0 = (1700 + 500 \cos \theta) \text{ Hertz}$$

where $\theta$ varies from 0° to 180° over the portion of the bit in which the mark space frequency transition takes place. For the case when $\theta = 0$ the output frequency will equal 2200 Hz. When $\theta = 180°$ the output frequency will equal 1200 Hz. The specific numerical values in the above equation can be altered to correspond to any desired magnitude of frequency change. If the frequency transitions are to be quantized into M levels then $\theta$ varies in $180/(M-1)$ steps. FIG. 4 gives the various step frequencies for $M = 8$.

The manner in which the apparatus shown in FIG. 1 accomplishes the above described incrementation of the output frequency will now be described. The divide by N in this example is designed to change from 455 to 833 over one half of the bit period. A three bit up-down counter 20 controls the various divide by N control circuit 24. FIG. 4 shows the relationship between the state of the up-down counter 20 and the state of divide by N counter 32 to the output frequency on output conductor 36. The up-down counter clock rate determines how fast the mark-space transition occurs. This transition rate is controlled by divide by 60 counter 12. Divide by 60 counter 12 produces a clock rate of 16.8 kilohertz. This provides a half bit period transition time of 417 microseconds which corresponds to a 1200 bit per second data rate.

Assume the transmit data input signal is a mark and will change to a space. The output frequency at output conductor 36 will be 2200 hertz. Just prior to the change in the input signal the up-down counter 20 is in the up state so that the output on the plurality of output coonductors 22 will be a binary 111. The 111 input to up-detector 26 causes it to produce a low level output signal which prevents any additional clock pulses from being transmitted through NAND gate 14 to the up-clock input 15. When the transmit data signal changes to a space, the signal on the input conductor 13 goes to a low level. This low level input signal prevents any signal from being conducted through NAND gate 14 to the up-clock line 15. The low level signal on input conductor 13 is converted to a high-level signal by inverter 18. The output of up-down counter 20 at its second plurality of output conductors 28 is the complement of the output signal present at output conductors 22. Until the state of up-down couner 20 is all zeros down-detector 30 will produce a high level output signal. NAND gate 16 during the period of time when a space is being transmitted will be receiving a high level input signal from inverter 18 and a high level input signal from down-detector 30. Therefore, the clocking pulses produced by divide by 60 counter 12 will cause up-down counter 20 to count down to a state of 000. When a state of 000 is generated the signal on the plurality of outputs conductors 28 will be a binary 111 which will cause down-detector 30 to transition to a low level output signal which will disable NAND gate 16.

Up-down counter 20 has gone from a state of 111 to 000. Because of the clock rate produced by divide by 60 counter 12 this transition from a state of 111 to 000 requires exactly one half of a data bit. As is shown in both FIG. 3 and FIG. 4, the output frequency has been incrementally changed from 1200 Hz to 2200 Hz. The divide by N counter has incrementally transitioned from a count of 833 to a count of 455. The divide by N control circuit 24 receives the output of up-down counter 20 on the plurality of output conductors 22. Divide by N control circuit 24 is programmed to convert the output of up-down counter 20 into a control signal such that divide by N counter produces the proper division ratio. The 1 MHz clock signal from crystal oscillator 10 is divided by that division ratio. The resulting square wave output signal from divide by N counter 32 is coupled to sine wave generator 34. Sine wave generator 34 converts the incoming square wave signal into a stepped approximation to a sine wave which is then coupled to the desired transmission medium.

Circuits for implementing the divide by N control circuit 24 and divide by N counter are known to those skilled in the art. The particular circuit used in the present preferred embodiment is described in U.S. Pat. No. 3,792,360 by Earl F. Carlow which is assigned to the assignee of the present invention.

Divide by N counter 32 is a sequential binary counter which counts up to the number which is the highest power of two below the desired division ratio. Additional counts required to accomplish the particular division are obtained by feeding back signals from the various bits of the sequential counter such that they add up to the total number of additional counts required. FIG. 5 illustrates this process. For a 111 state of up-down counter 20, divide by N control circuit 24 instructs divide by N counter 32 to produce a basic count of 512 plus an additional count of 321. The additional count of 321 is produced by taking the outputs of the counters designated by an X in FIG. 5. A count of 321 is produced by combining the output of the 256 counter and the output of the 64 counter and the 1 counter. FIG. 5 shows the additional combinations which are utilized for the transition counts between 111 and 000.

The operation of the apparatus for the mark-space transition has been described above. A similar sequence of events occurs with a space-to-mark data change where the up-down counter 20 advances from a state of 000 to a state of 111.

It will be apparent to those skilled in the art that the disclosed digital tone decoder may be modified in numerous ways and may assume many embodiments other than the preferred forms specifically set out and described above. For example, the transition time required to transition from a mark to a space and back can be varied from the half data bit time interval utilized in the present preferred embodiment. The FSK frequency of 2200 Hz and 1200 Hz utilized in the present preferred embodiment may also be altered. The number of incremental frequency steps taken during the transition from one output frequency to another can also be increased or decreased. Accordingly, it is intended by the appended claims to cover all such modifications of the invention which fall within the true spirit and scope of the invention.

What is claimed is:

1. A digital FSK time rate change modulator responsive to a digital input signal for generating a first or a second output frequency and for switching from one output frequency to the other in small increments over a predetermined time interval comprising:
    a. means for generating a first and a second timing signal;
    b. input means for receiving the digital input signal;
    c. up-down counter means having an output terminal means, an up-count input and a down-count input for counting up and down between a first state a second state;
    d. first gating means coupled to said output terminal means and to said input means for passing said second timing signal to said up-count input when a high level digital input signal is present on said input means and said up-down counter means is not in the second state;
    e. second gating means coupled to said output terminal means and to said input means for passing said second timing signal to said down-count input when a low level digital input signal is present on said input means and said up-down counter means is not in the first state;
    f. variable counter means for dividing the first timing signal by a predetermined number in response to the count on said output terminal means and for generating a digital output signal; and
    g. sine wave generator means coupled to said variable counter means for generating a digitally aproximated sine wave having the same frequency as the digital output signal from said variable counter means.

2. A digital FSK time rate of change modulator responsive to a digital input signal for generating a first or a second output frequency and for switching from one output frequency to the other in small increments over a predetermined time interval according to claim 1 wherein said means for generating a first and a second timing signal further includes:
    a. crystal oscillator means for generating the first timing signal; and
    b. fixed counter means coupled to the output of said crystal oscillator means for dividing the first timing signal by a predetermined number to generate the second timing signal.

3. A digital FSK time rate of change modulator responsive to a digital input signal for generating a first or a second output frequency and for switching from one output frequency to the other in small increments over a predetermined time interval according to claim 1 wherein said variable counter means further includes:
    a. control means responsive to the count on said output terminal means for generating a control signal; and
    b. a variable counter responsive to the control signal for dividing the first timing signal by a variable division ratio.

4. A digital FSK time rate of change modulator responsive to a digital input signal for generating a first or a second output frequency and for switching from one output frequency to the other in small increments over a predetermined time interval comprising:
    a. means for generating a first and a second timing signal;
    b. up-down counter means responsive to the second timing signal and having an output terminal means for counting up and down between a first state and a second state in response to the digital input signal; and
    c. means for dividing the first timing signal by a variable division ratio in response to the digital output signal on said output terminal means and for converting that divided signal into a digitally approximated sine wave having the same frequency.

5. A digital FSK time rate of change modulator responsive to a digital input signal for generating a first or a second output frequency and for switching from one output frequency to the other in small increments over a predetermined time interval according to claim 4 wherein said means for generating a first and a second timing signal further includes:
    a. crystal oscillator means for generating the first timing signal; and
    b. fixed counter means coupled to the output of said crystal oscillator means for dividing the first timing signal by a predetermined number to generate the second timing signal.

6. A digital FSK time rate of change modulator responsive to a digital input signal for generating a first or a second output frequency and for switching from one output frequency to the other in small increments over a predetermined time interval according to claim 4 wherein said up-down counter means further includes:
    a. input means for receiving the digital input signal;
    b. an up-down counter having an up-count input and a down-count input for counting up and down between the first state and the second state;
    c. first gating means coupled to said output terminal means and to said input means for passing said second timing signal to said up-count input when a high level digital input signal is present on said input means and said up-down counter is not in the second state; and
    d. second gating means coupled to said output terminal means and to said input means for passing said second timing signal to said down-count input when a low level digital input signal is present on said input means and said up-down counter is not in the first state.

7. A digital FSK time rate of change modulator responsive to a digital input signal for generating a first or a second output frequency and for switching from one output frequency to the other in small increments over a predetermined time interval according to claim 4 wherein said means for dividing further includes:
   a. variable counter means for dividing the first timing signal by a predetermined number in response to the count on said output terminal means and generating a digital output signal; and
   b. sine wave generator means coupled to said variable counter means for generating a digitally approximated sine wave having the same frequency as the digital output signal from said variable counter means.

8. A digital FSK time rate of change modulator responsive to a digital input signal for generating a first or a second output frequency and for switching from one output frequency to the other in small increments over a predetermined time interval according to claim 7 wherein said variable counter means further includes:
   a. control means responsive to the count on said output terminal means for generating a control signal; and
   b. a variable counter responsive to the control signal for dividing the first timing signal by a variable division ratio.

* * * * *